Jan. 12, 1965  C. O. DENNIS ETAL  3,164,865
CURING RIM
Filed Oct. 27, 1960  2 Sheets-Sheet 2

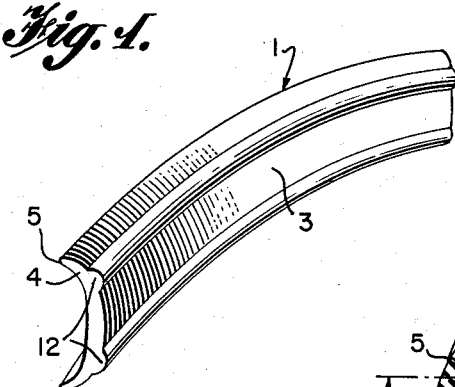
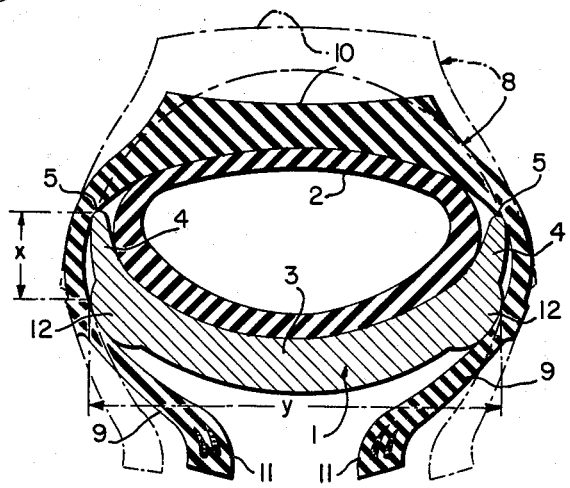
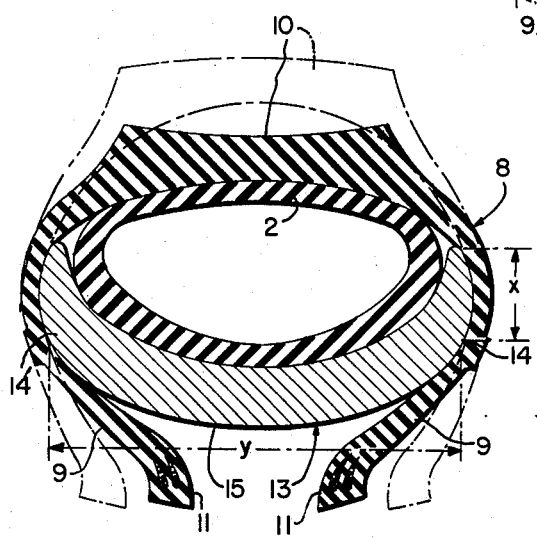
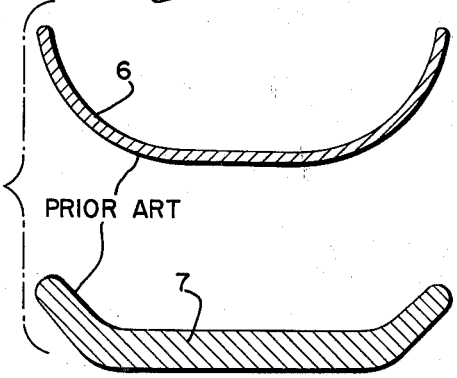

INVENTORS
Clement O. Dennis and
William C. Shaver
BY Mason, Fenwick & Lawrence
ATTORNEYS

United States Patent Office 3,164,865
Patented Jan. 12, 1965

3,164,865
CURING RIM
Clement O. Dennis and William C. Shaver, Macon, Ga., assignors to Precision Recapping Equipment Company, Macon, Ga., a corporation of Georgia
Filed Oct. 27, 1960, Ser. No. 65,425
6 Claims. (Cl. 18—45)

This invention relates to curing rims of the type used in recapping vehicle tires to serve as a surface upon which an air bag may react to exert pressure upon a tire in a re-capping mold to seat the tire cap in the mold matrix. The rim also serves to prevent the air bag from blowing out between the rim and the tire sidewalls.

In the process of tire recapping, it is necessary to place a layer of new unvulcanized rubber about the buffed surface of the tire, place this assembly into a recapping mold and press the new rubber into the tread design of the mold matrix and hold it there while the tire is subjected to vulcanizing heat. The pressure is usually applied by means of an air bag, or tube, which seats upon a curing rim and, when inflated, exerts a pressure around the entire tire to press the new rubber firmly into the matrix tread design. The air bag and back-up, or curing rim are placed in the tire before the tire is put into the mold.

There is no problem in placing a tire in the so-called watchcase type mold, where the mold is in two hinged sections divided along the centerline of the tread face of the tire, as the tire can be placed in one section of the open mold and other section closed upon it. The split ring mold, where the mold is split along a diameter of the tire, also receives the tire without need for distorting. The continuous ring type presents a major problem, however, as the tire must enter an opening of less diameter than that of the tire with its layer of new rubber, and, after insertion, be expanded to force the new rubber into the grooves of the tread design of the matrix.

The reduction of tire diameter can be done in several ways. One way is to spread apart the tire beads. As the beads are reinforced by steel wires, their diameter will remain the same but the outer diameter of the tire will be reduced. It has been found that a similar result can be obtained by compressing the tire beads, that is, by pressing the beads toward one another pulling the tire sidewalls around the curing rim. While sufficient reduction can be had by the latter method under some conditions with small tires upon which a highway type tread design of slight depth is to be embossed, it has been impossible with known equipment to get sufficient reduction without tire damage for inserting the large, heavy tires for trucks or road equipment, the so-called one ply wire cord tires, or for that matter any tire having a heavy cleat design or the deep grooved designs of mud and snow treads.

The object of the present invention is to provide an improved curing rim for use in recapping tires, which will make possible much greater tire diameter reduction by compressing the tire beads than has been possible with prior curing rims.

Another object of the invention is to provide curing rims having perches, or fulcrums, inwardly from the rim edges about which the tire side walls will bend, the perches being spaced sufficiently from the rim edges and from the transverse center of the rim to substantially reduce the free flexing length of tire wall beneath the rim and thereby increase the amount of sliding movement of the tire walls around the rim edges when the beads are compressed to result in increased tire diameter reduction.

A further object of the invention is to provide curing rims having the above general advantages which will cause the tire tread surface to dimple at a plurality of equally spaced points around the circumference to effectively reduce the overall diameter and allow the tire to slip into and out of a mold.

Other objects of the invention will become apparent from the following description of practical embodiments, thereof, when taken in conjunction with the drawings which accompany, and form part of, this specification.

In the drawings:

FIGURE 1 is a perspective view of one member of a sectional curing rim embodying the principles of the present invention;

FIGURE 2 is a transverse section through the rim member shown in place in a tire, the position of the tire after compression of the beads being shown in full lines; and the position of the tire with the beads released being shown in dotted lines;

FIGURE 3 is a view similar to FIGURE 2 showing a slightly modified rim;

FIGURE 4 shows the cross section of two of the curing rims now in use;

Figure 5:
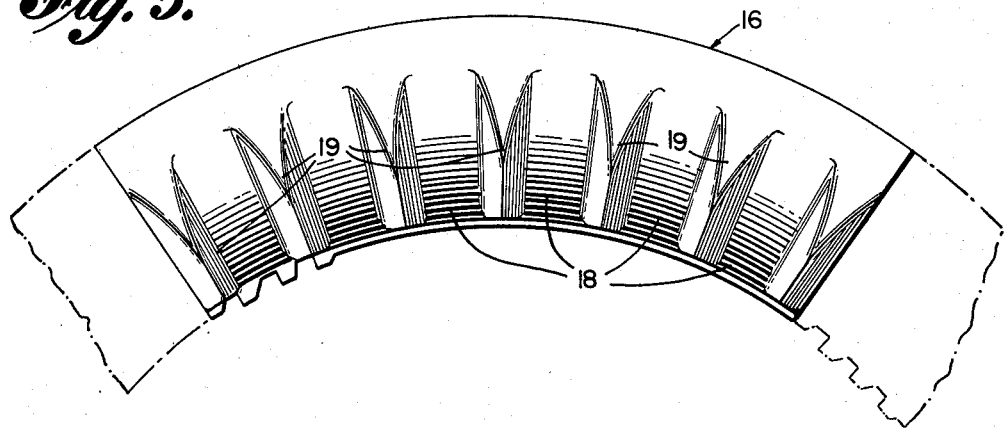
FIGURE 5 is a side elevation of one section of a curing rim of modified design.

In general, the invention contemplates a curing rim which has a cross-section designed to contact the side walls of a tire in which it is used in such manner as to restrict to a minimum the length of tire wall adjacent the bead which is free to flex when the beads of the tire are moved toward one another, so that the sliding of the tire wall around the rim edge to permit the required bead movement is greatly increased and the tire tread diameter will have maximum reduction. The invention further contemplates such a rim wherein the pressure contact of the tire walls with the rim varies along the length of the rim to cause the tire to dimple.

Referring to the drawings in detail, and first adverting to that form of the invention shown in FIGURES 1 to 4, there is shown one member 1 of the several which are needed to form a complete circular rim of the sectional type. The member illustrated is a cast unit of the general type disclosed in Patent No. 2,398,151 to Napier, issued April 9, 1946, but the invention is concerned with the cross-sectional arrangement of the rim whether the rim is cast and of several unconnected sections, or is fabricated from flexible material, or is of hingedly connected sections. The member 1 is merely illustrative of a portion of the complete annulus which forms the curing rim.

Referring particularly to FIGURE 2, it will be noted that the rim is generally crescent-shaped in cross-section, forming a channel in which the air bag 2 may seat. The central portion 3 of the crescent-shaped member forms the bottom of the channel while the horns 4 form the sides. The tips of the horns form the lips, or free edges, 5 of the channel. It will be understood in the light of subsequent description, that the crescent shape is no essential to the invention, but the general cross-section could be of uniform thickness, similar to the prior art rolled steel type of rim shown at 6 in FIGURE 4, or previous cast types as shown at 7, so long as the fulcrums, or perches, to be described, or their equivalent, are present.

Before proceeding with further description of the rim, it should be noted that when using an oval, or flat, type of air bag, or curing tube, the rim fits well within the tire 8. The lips, or edges, 5 of the rim contact the tire far up the side walls 9 close to the ground contacting, or tread area, 10 and far removed from the beads 11. Due to this arrangement, the free edges of the tire, that is those portions of the tire sidewalls from the lines of contact by the rim edges to the beads, provide relatively long lever arms which are free to flex, or swing, using the edges of the rim as fulcrums. It is well known that the longer the lever, the more closely the swinging movement of the free end of the lever approaches a straight line. In moving the beads of a tire there can be no deflection from a straight line due to the reinforcing cable in the beads. Therefore, any tendency of the beads to move from the straight path must be compensated for by pulling the tire down toward the curing rim to increase the free length of tire wall beyond the rim edge. If the tire length is relatively long at the outset, there will be little deflection to be accommodated for and, consequently, little movement of the tire relative to the rim and little diameter reduction.

In order to increase the tire movement during the compressing of the beads, the rim of the present invention provides new fulcrums, removed inwardly from the rim edges, to thus contact the tire sidewalls closer to the beads and reduce the free length of the tire wall from the fulcrum to the bead. Thus, much shorter lever arms are provided so that the compressive movement of the beads will tend to deflect the beads from their straight path movement to a much greater degree, and considerably more tire wall will have to be drawn over the rim edges to compensate for it. Obviously, the tread face of the tire will be brought much closer to the curing rim under these circumstances and the tire diameter will be greatly reduced.

Referring particularly to FIGURE 2, the added fulcrums, or perches, are shown at 12 and take the form of annular ribs around the underside of the rim. The ribs are rounded in cross-section, to provide smooth surfaces about which the tire walls may bend and over which they may slide. It will be noted that the fulcrums are spaced a substantial distance radially inward from the rim edges and have maximum spacing between them transversely of the rim.

The radially inward spacing of the fulcrums from the rim edge has been indicated as a distance "$x$" in FIGURE 2, while the spacing of the fulcrums from one another is indicated as a distance "$y$." Increasing either of these dimensions of the rim while maintaining the other constant will result in increasing the amount of tire diameter reduction obtainable. In the rim illustrated, the width "$y$" is approximately equal to the full width of the rim at the edges 5, thus maintaining the effect width of the rim for a substantial distance radially inward from the rim edge.

As mentioned above, the actual cross-sectional contour of the rim is not important, so long as the fulcrums are provided. Thus, if the relative distance "$x$" and "$y$" are maintained, it is immaterial whether the fulcrums be provided as offset ribs 12, as shown in FIGURE 2, or the resultant shape of the rim be of smooth contour as shown in FIGURE 3. In FIGURE 3 the rim 13 has fulcrum points 14, which provide the same functional result as those of the rim of FIGURE 2. The under surface 15 of the rim of FIGURE 3 is obtained by generating a smooth curve which includes the edges 5, the fulcrum surfaces of the beads 12 and the bottom surface of the central portion of the rim of FIGURE 2.

It will be obvious that even with a rim of the rolled steel type shown at 6 in FIGURE 4, the same effect can be obtained by providing annular ribs of considerable height projecting from the bottom surface of the rim to increase the distances shown as "$x$" and "$y$" in FIGURES 2 and 3.

The rim of the present invention will be used in the same manner as a conventional rim. When inserted in a tire and with the tire in a mold, the rim serves the usual function of backing up the curing bag and preventing its blow-out adjacent the tire side walls. It is only when the tire is to be placed in a mold, or removed therefrom, that the tire beads are pressed toward one another and the improvement of the present invention acts to ensure adequate tire diameter reduction. The reduction obtainable through use of the rim of the present invention is sufficient to permit easy insertion and withdrawal of tires having tread patterns of great depth.

Figure 6:
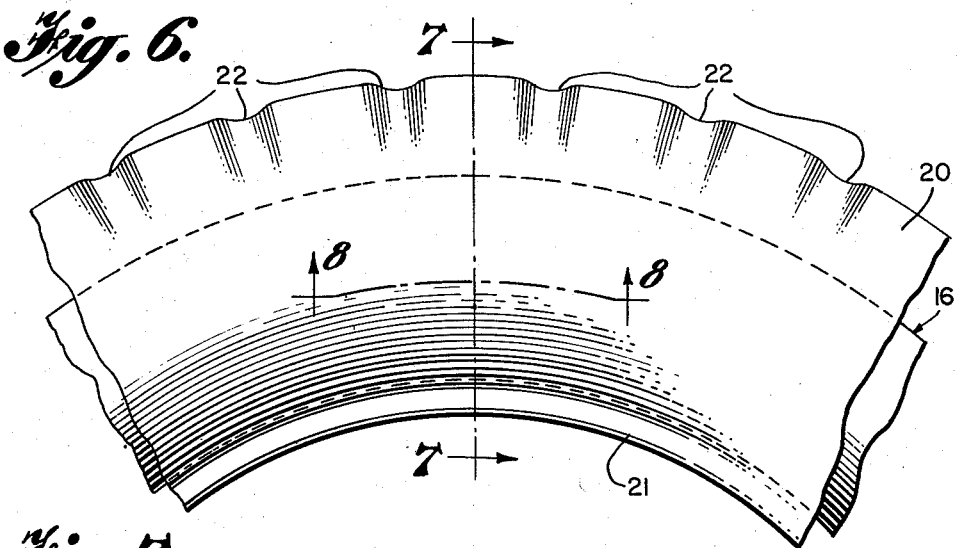
FIGURE 6 is a side elevation of a portion of a tire being drawn over the rim of FIGURE 5 showing the manner in which the tire dimples to reduce its diameter.
Figure 7:
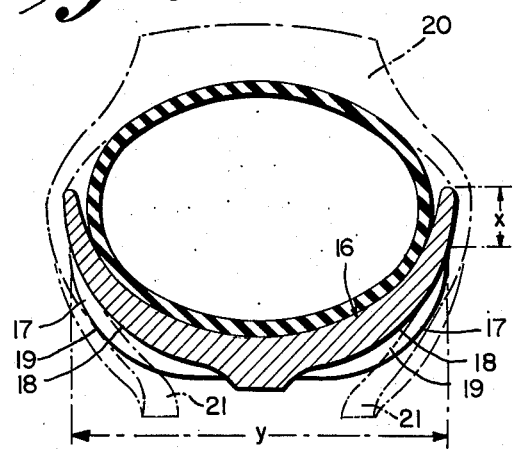
FIGURE 7 is a transverse section taken on the line 7—7 of FIGURE 6.
Figure 8:
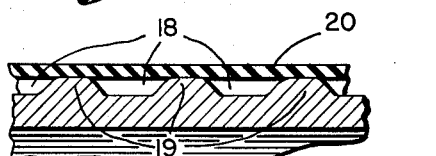
FIGURE 8 is a section taken on the line 8—8 of FIGURE 6.

In FIGURES 5 through 8, a slightly modified form of the invention is shown which is particularly adapted for use with tires which are extremely difficult to reduce in diameter enough to slip into and from a mold. The so-called one ply wire cord tire is an example of this type. This tire has the usual bead wires, but there is only one body ply consisting of small steel cables formed of twisted steel wires. The cables run from bead to bead radially across the crown. The cables are very close, almost touching, and are embedded in the rubber casing. There are three crown plies, or breakers, which consist of additional cables encased in rubber. The angle of the cables in the crown plies are extremely flat, with some approaching the circumferential. This construction results in a tire which resists diameter reduction to such an extent that if sufficient pressure is applied in spreading or compressing the beads, the tread portion will cave, or buckle, inwardly very severely. Previous attempts to reduce the diameter of these tires have been confined to buckling the tire tread in several places to a depth of several inches. Some tire failures have been traced to permanent injuries in the areas which have been buckled.

The rim 16 shown in FIGURES 5 through 8 is similar to that previously described, in that it has the same general overall contour including the perches 17. The distances $x$ and $y$ are maintained. The rim differs from the first-described form by having a plurality of radially disposed grooves 18 traversing the perches 17 and equally spaced apart circumferentially of the rim. This creates an alternating series of recesses 18 and ridges 19.

When the rim is placed in a tire 20 and the beads 21 forced together, as previously described, the tire side walls will be pulled over the perches 17 as before. Due to the ridge and recess formation of the perch, the pressure will vary on the tire wall, being greater across the ridges than radially across the recesses. The greater pull at the ridge areas will cause the tire to dimple slightly opposite each ridge, as at 22. Each concavity will be very slight, and therefore will not damage the tire, but there will be many of them around the entire tire circumference and considerable diameter reduction will result.

While in the above practical embodiments of the invention have been disclosed, it will be understood that the details of construction shown and described are merely for purposes of illustration, and the invention may take other forms within the scope of the appended claims.

What is claimed is:

1. A device for temporarily reducing the diameter of a tire comprising, with an inflated tube therein, a rigid backing rim for the tube in the tire and leaving the beads of the tire in the clear, means to engage and press said beads toward each other, and elements on the rim at spaced intervals about the circumference thereof and positioned to engage the sidewalls of the tire on the inside thereof intermediate the beads and the tread thereof and arranged to cause the adjacent tread portions of the tire to be buckled radially inward as the beads are pulled together.

2. A curing rim for insertion within a tire between the tire side walls to serve as a back-up member for a curing bag during the curing of the tire in a mold, the rim comprising, an annulus of general concave-convex cross-section having its concave side facing outwardly of the annulus to form a recessed seat for the curing bag and having its convex side facing inwardly of the annulus with the junctures of the concave and convex sides forming the edges of the rim, the inwardly facing convex side having enlargements thereon spaced radially inward of the edges of the rim and extending annularly of the rim and about which the side walls of the tire may flex and slide when the beads of a tire in which the rim is placed are pressed toward one another to reduce the external diameter of the tire, the enlargements each being arcuate in cross-section and curving sharply from the area of greatest enlargement toward the adjacent side edge of the rim and from the area of greatest enlargement toward the cross-sectional center of the convex face of the rim.

3. A curing rim as claimed in claim 2 wherein, the enlargements are spaced apart a distance substantially equal to the width of the rim.

4. A curing rim as claimed in claim 2 wherein, the enlargements are traversed at spaced points along the annular length of the rim by grooves extending radially of the rim, whereby spaced recesses are formed about the rim separated by segments of the enlargements, into which recesses the walls of a tire in which the rim is placed may buckle during reduction in tire diameter.

5. A curing rim for insertion within a tire between the tire side walls to serve as a back-up member for a curing bag during the curing of the tire in a mold, the rim comprising, an annulus of general concave-convex cross-section having its concave side facing outwardly of the annulus to form a recessed seat for the curing bag and having its convex side facing inwardly of the annulus with the junctures of the concave and convex sides forming the edges of the rim, the inwardly facing convex side having fulcrum means thereon in the form of fulcrum beads projecting from the convex surface of the rim, the fulcrum beads being spaced radially inward of the edges of the rim and extending annularly about the rim and about which the side walls of the tire may flex and slide when the beads of the tire in which the rim is placed are pressed toward one another to reduce the external diameter of the tire.

6. A curing rim as claimed in claim 5 wherein, the fulcrum beads are spaced apart transversely of the rim a distance substantially equal to the width of the rim.

References Cited by the Examiner
UNITED STATES PATENTS

| | | | |
|---|---|---|---|
| 1,470,657 | 10/23 | Traum | 18—45 |
| 2,561,573 | 7/51 | Hovlid | 18—45 XR |
| 2,724,861 | 11/55 | Cox et al. | 18—45 XR |
| 2,728,945 | 1/56 | Clapp | 18—45 XR |
| 2,817,877 | 12/57 | Fannen | 18—45 |
| 2,988,780 | 6/61 | Dennis et al. | 18—45 |

MICHAEL V. BRINDISI, *Primary Examiner.*
WILLIAM J. STEPHENSON, *Examiner.*